Patented Nov. 15, 1949

2,488,034

UNITED STATES PATENT OFFICE 2,488,034

FLAME RESISTANT MATERIALS

Raymond A. Pingree, Cranston, and Raymond C. Ackerman, Providence, R. I., assignors, by mesne assignments, to Sun Chemical Corporation, New York, N. Y., a corporation of Delaware No Drawing. Application November 18, 1943, Serial No. 510,790

1 Claim. (Cl. 117—136)

This invention relates to new resinous products obtained by condensation of guanyl urea phosphate with aldehydes, especially formaldehyde, and to the process of effecting such condensation.

We have discovered that guanyl urea phosphate reacts with aldehydes, and especially formaldehyde, to produce valuable condensation products which polymerize readily to form infusible resinous bodies. These synthetic resins have properties which render them of great value as adhesives, and for impregnating purposes. One particular merit lies in the fact that they are completely flameproof and impart flame resistance to materials to which they are applied. They may be used advantageously in the manufacture of fireproof plywood, where they serve the dual purpose of an adhesive for binding the layers of wood together and of imparting flame resistance to the final product; for flameproofing of textiles and paper to be used for draperies, awnings, interior decorations, etc.; and in molding compositions. When used the treatment of paper and textiles it has been found desirable to incorporate a plasticizing agent in with the resinous material so that the resulting product will not be too stiff and brittle. Suitable plasticizers for this purpose are quaternary ammonium derivatives of fatty acids, such as stearoyloxymethyl pyridinium chloride.

Another use for these products is in the treatment of fibrous structural materials such as wood and cellulose composition board to increase their flame resistance.

The guanyl urea phosphate used in this process was prepared by reacting equi-molar proportions of dicyandiamide and ortho-phosphoric acid in the presence of water, as described by Cochet and Houdin (Comptes rendus hebdomadaires des seances de l'academie des sciences, vol. 195, page 326, 1932). The purified material was found by analysis to contain 49.0% H₃PO₄ which is in agreement with their findings, and corresponds with the formula:

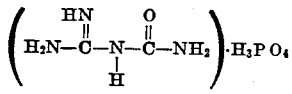

We have found that condensation with aldehydes is effected simply by heating 1 mol of the guanyl urea phosphate with 2 to 3 mols of an aldehyde, such as formaldehyde or acetaldehyde at 40° to 100° C., until the mixture becomes perfectly clear and free from undissolved particles. At this stage the product is a clear, colorless, slightly viscous liquid which is completely soluble in water in all proportions. This liquid intermediate stage may be further polymerized for use in molding compositions, or may be used directly for the impregnation of fabrics, paper, wood, etc. It may be finally carried to a hard, infusible stage by the further application of heat.

In order to modify the properties of the resin or to accelerate curing, it may be co-polymerized with urea-formaldehyde or melamine-formaldehyde resins.

The following examples are illustrative of our invention, which is not restricted to the details thereof:

*Example I.*—200 grams of crystalline guanyl urea phosphate was added to 243 grams of 37% formaldehyde and 557 grams of water. The molar ratio is 1 of guanyl urea phosphate to 3 of formaldehyde. While stirring constantly the mixture was heated to 50° C., and maintained at this temperature until solution was complete. The mixture, when cooled to room temperature, was a clear, colorless, slightly viscous liquid.

A piece of cotton fabric was treated by padding, with this intermediate resin solution. The fabric was then dried in air and was finally subjected to a temperature of 150° C. for 6 minutes to insolubilize the resin. The treated cloth was found to be completely flameproof. The flameproof property of the fabric was not adversely affected by immersing in running water for several days.

*Example II.*—200 grams of guanyl urea phosphate and 30 grams of urea were added to 324 grams of 37% formaldehyde and 246 grams of water. While stirring constantly the mixture was heated to 70° C., and maintained at this temperature for 2 to 3 hours, or until the solution was quite viscous.

This syrupy resin solution was used as an adhesive for bonding several sheets of veneer to form a piece of fireproof plywood.

*Example III.*—200 grams of guanyl urea phosphate was added to 88 grams of acetaldehyde and 212 grams of water. The molar ratio is 1 of guanyl urea phosphate to 2 of acetaldehyde. While stirring constantly the mixture was heated to 50° C. and maintained at this temperature for several hours, or until the solution became quite viscous. The bulk of the water was removed by placing the resin solution in a vacuum oven at a temperature of 40° C. for several hours. It was then hardened to a colorless, infusible mass by baking at 100° C. over night.

In carrying out our invention many variations and modifications other than those described in the above examples are possible.

In place of the formaldehyde and acetaldehyde mentioned in the examples, it will be obvious that we may use other aldehydes, as found suitable and desirable.

We have found that the curing of these resins will be accelerated greatly by the incorporation of small amounts of melamine formaldehyde resins. Curing may also be accelerated to some extent by the incorporation of ammonium salts.

Fibrous materials, such as wood flour, may be incorporated with these resins to improve the physical properties of the insolubilized product.

Fireproof surface coatings may be prepared from these resins by incorporating suitable pigments in them.

Other suitable changes and variations may be made in carrying out our invention without departing from the spirit and scope thereof, as defined in the appended claim.

Having thus described our invention, what we claim as new and desire to secure by Letters Patent is:

A process of making flame resistant materials which comprises heating one mol of guanyl urea phosphate with 2-3 mols of formaldehyde at 40° C. to 100° C. until a clear, colorless, slightly viscous, water soluble condensation product is formed, and then further polymerizing by heat to hard, infusible, insoluble state after impregnation upon a textile fabric in the presence of a melamine formaldehyde resin and stearoyl oxymethyl pyridinium chloride.

RAYMOND A. PINGREE.
RAYMOND C. ACKERMAN.

REFERENCES CITED

The following references are of record in the file of this patent:

UNITED STATES PATENTS

| Number | Name | Date |
|---|---|---|
| 2,089,697 | Groebe | Aug. 10, 1937 |
| 2,191,362 | Widmer et al. | Feb. 20, 1940 |
| 2,285,418 | D'Alelio | June 9, 1942 |
| 2,338,637 | Gundel | Jan. 4, 1944 |

FOREIGN PATENTS

| Number | Country | Date |
|---|---|---|
| 476,043 | Great Britain | Nov. 29, 1937 |
| 501,288 | Great Britain | Feb. 23, 1939 |

OTHER REFERENCES

Van Kleeck, News Edition (Amer. Chem. Soc., June 10, 1941) pp. 626–628.